Feb. 26, 1957 I. M. MATHISEN 2,782,471
MOLDING MACHINES
Filed April 9, 1953

INVENTOR
Ivar Magnus Mathisen
By George Hasley
ATTORNEY

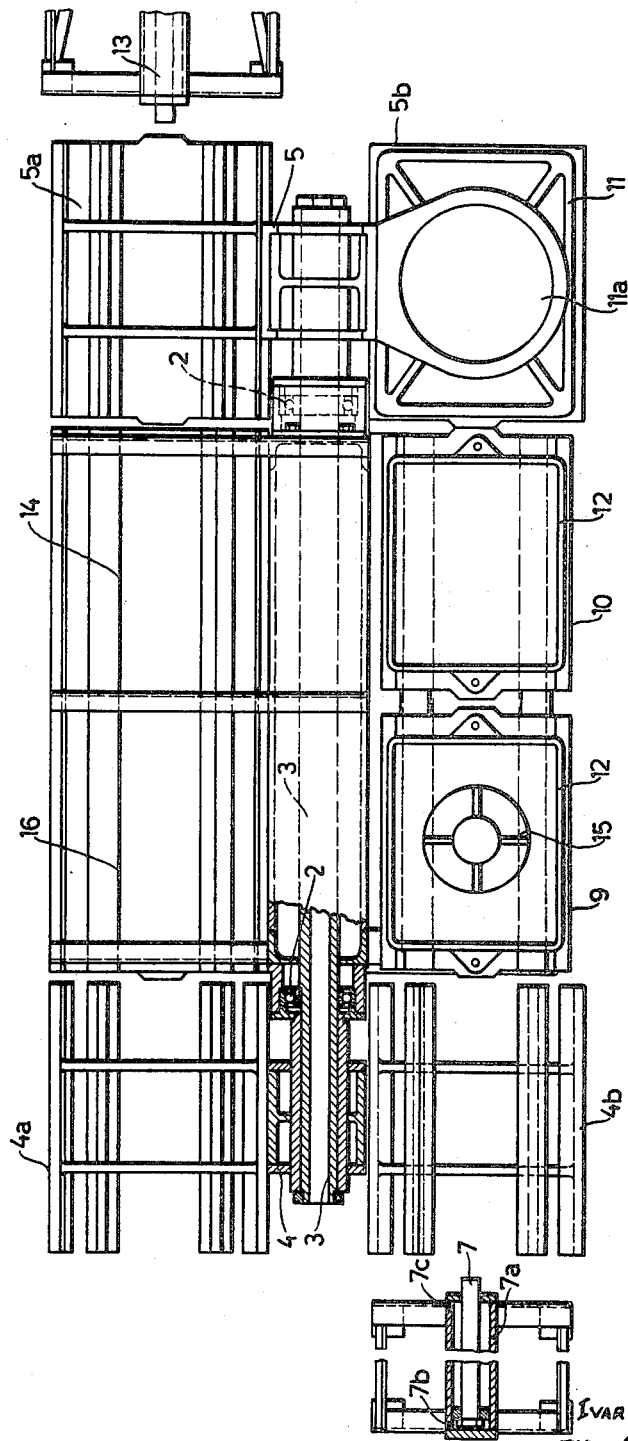

United States Patent Office 2,782,471
Patented Feb. 26, 1957

2,782,471

MOLDING MACHINES

Ivar Magnus Mathisen, Sandnes, Norway, assignor to Aktiebolaget Westin & Backlund, Stockholm, Sweden, a corporation of Sweden Application April 9, 1953, Serial No. 347,758

Claims priority, application Sweden September 11, 1952

7 Claims. (Cl. 22—20)

Conventional molding machines for foundry purposes usually comprise a combined unit composed of a jolting device, a squeezing device and a lifting device combined into one single unit. In certain cases the lifting device has been replaced by an inversion device and a pattern drawing device. The pattern plate which carries the pattern is, in most cases, screwed onto the mold board so that a certain amount of time will be consumed in replacing the pattern plate. Automatic molding machines constructed in recent time usually aim at operating the machine automatically resulting in a large production, but since one type of flask molds can be treated in the machine at a time only the operation has to be interrupted when it is desired to replace the pattern plate. Such interruption causes a certain loss of time of appreciable magnitude.

The present invention has for its primary object to avoid this disadvantage by providing an automatic molding machine in which the pattern plate can be replaced without interrupting the treatment of the preceding pattern plate in the same machine.

Figure 1:
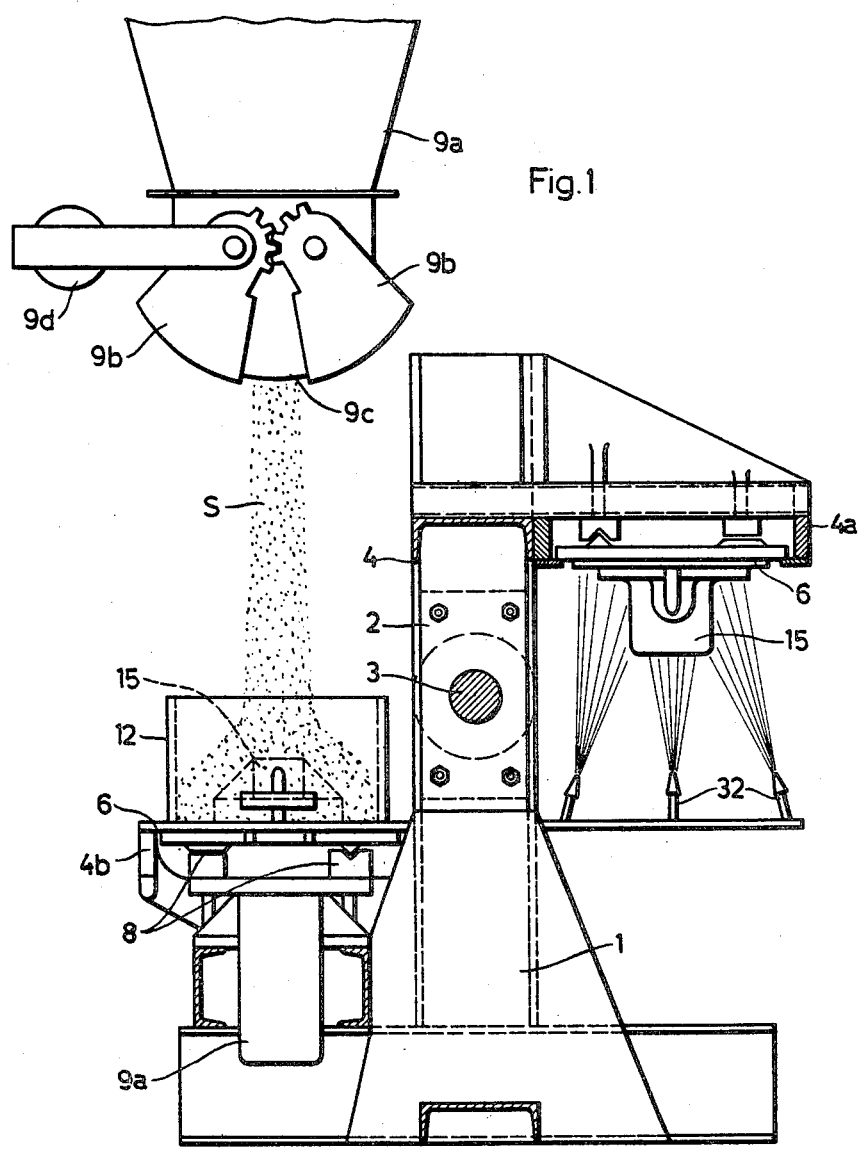
Figure 2:
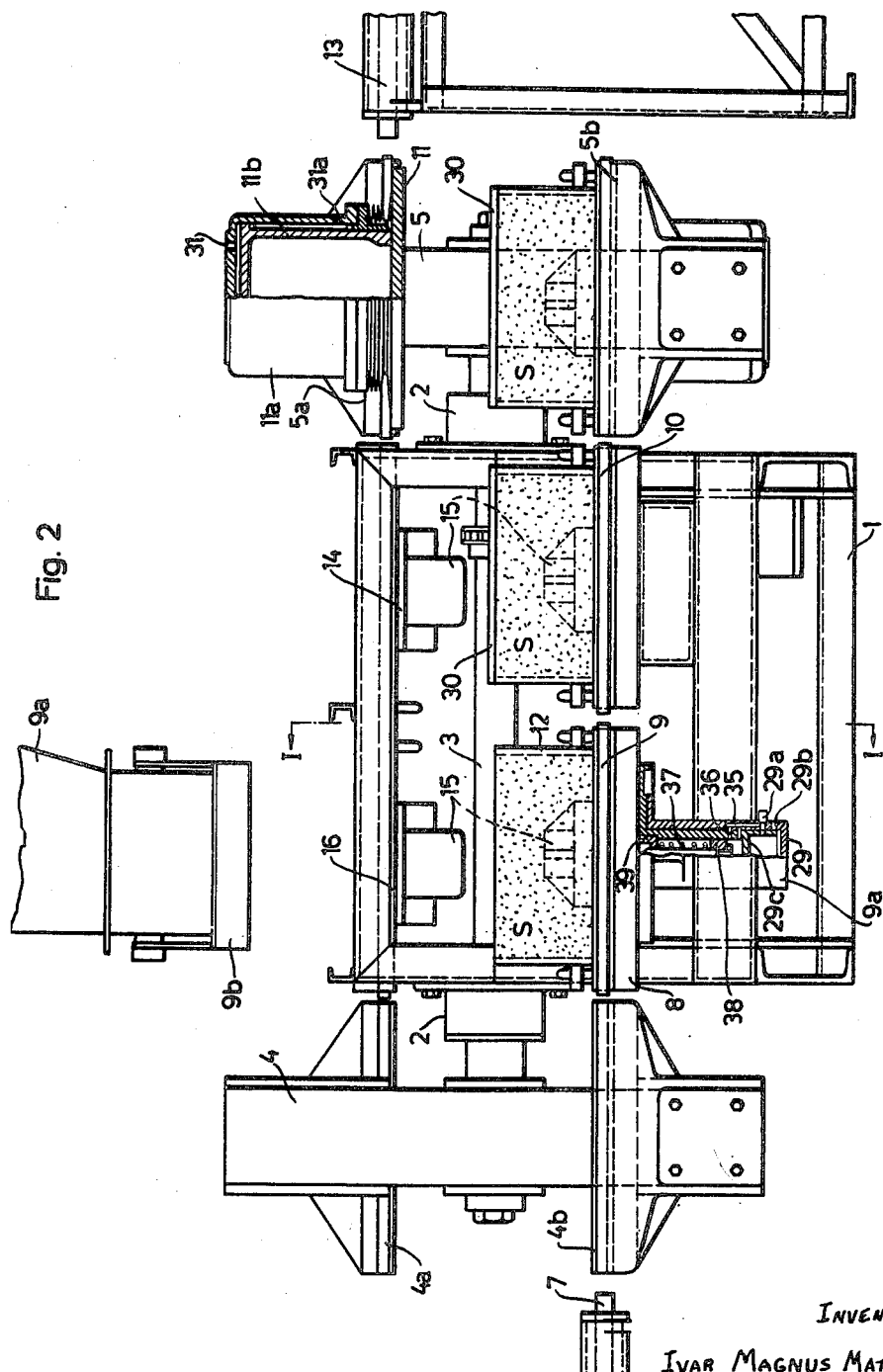
Figure 3:
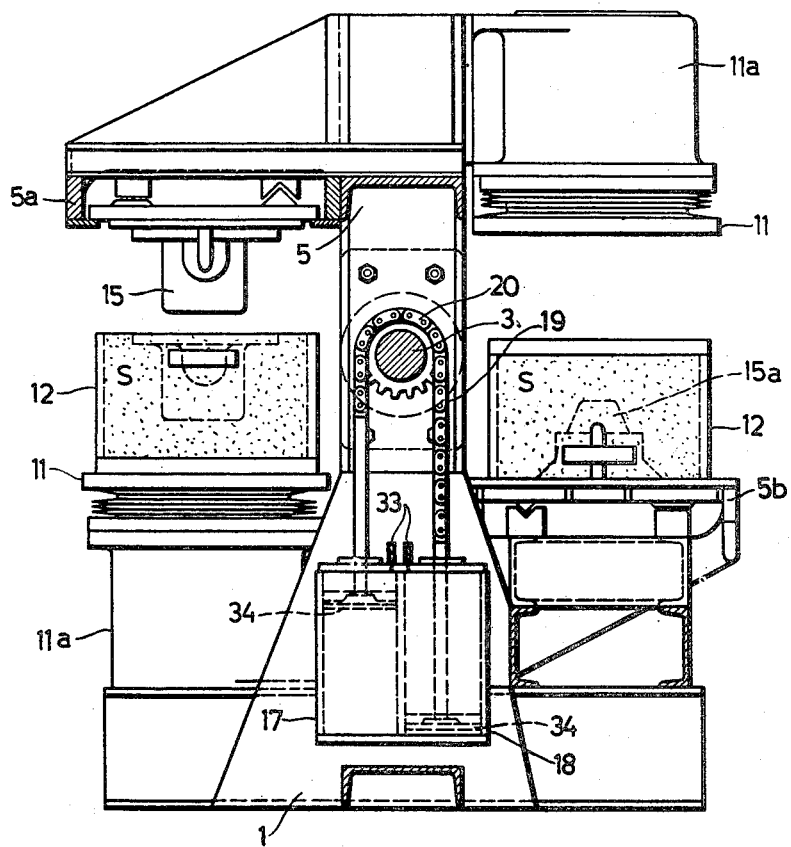

The accompanying drawings illustrate a constructional form of a molding machine according to the invention. In these drawings:

Figure 1 is a vertical cross-sectional view taken on line I—I in Fig. 2, the latter figure being a side elevational view of the machine, partly in section, Figure 3 is a vertical cross-section on line III—III in Figure 2, and Figure 4 is a plan view of the machine, partly in longitudinal section.

Referring to the drawings, reference numeral 1 designates a frame having bearings 2 for a horizontally through-passing shaft 3 carrying at one end an inversion device 4 provided with two tables 4a, 4b and serving for the inversion of the pattern plate 6. At the other end the shaft 3 carries a squeezing, inversion and pattern parting assembly 5 provided with a pair of tables 5a and 5b.

The pattern plate 6 carrying the pattern 15 and movable along longitudinal slide guides 8 is placed in the proper position on the table 4b and fixed thereto by suitable clamping means and is, for example, by means of a piston or plunger 7, conveyed to the next station 9 (Figure 2). In the embodiment illustrated the plunger 7 operates in a pneumatic cylinder 7a having inlet and outlet ports 7b, 7c for compressed air which by means of a changeover valve and suitable connections thereto (not shown) may be supplied to either of these inlets. The plunger 7 may, however, also be operated mechanically, electrically or hydraulically. At station 9 the flask mold 12 is manually or automatically located in proper position, and sand is filled in, also manually or automatically. The sand S may, for instance be supplied from a hopper 9a with a bottom opening 9b adapted to be closed or opened by means of rotatable shutters 9c which are controlled by means of a lever 9d. After the sand filling operation the whole assembly is subjected to a vibrating operation by means of a suitable jolting device 29. The jolting device 29 (Fig. 2) comprises a cylinder 29 with inlet and outlet ports 29a, 29b for compressed air and with a jolting piston 29c. The cylinder 29 also contains a piston 38 actuated by a spring 37 and by compressed air through passages 35, 36. The piston 38 is associated with a location head 39 adapted, on the upward movement of piston 38, to engage a recess in the pattern plate 6 so as to locate the latter.

After the jolting operation the pattern plate and flask are ready for being conveyed to the next-succeeding station 10 at which, for example, a squeeze board 30 is placed on the top of the sand S and any loose sprue plugs to be used are inserted. The subsequent step consists in moving the pattern plate and flask over the lower table 5b of the inversion assembly 5. In this position, the sand in the flask will be compacted by a squeezing plate 11 adapted to be operated by a press 11a having a piston 11b so as to be pressed onto the sand and for compacting the sand S and for holding the flask mold and pattern plate during the succeeding inversion operation. The piston 11b may be operated hydraulically or pneumatically and has in usual manner, inlet and outlet ports 31, 31a for the hydraulic or pneumatic medium.

The inversion in carried out by turning the shaft 3 through one half of a complete rotation, so as to invert the whole assembly 5, thus causing the pattern plate together with the flask also to occupy an inverted position as compared to the previous position thereof. After the inversion, the squeezing plate 11 is lowered for drawing the flask and the pattern, whereby the flask 12 will be separated from the pattern plate in known manner. By means of a pneumatic or hydraulic piston, for example (not shown) the flask is now removed from the plate 11 and conveyed onto a roller table or other conveyor for any possibly necessary further treatment preparatory to casting. The pattern plate 6 will be transmitted by, for instance, a mechanical pneumatic or hydraulic plunger or piston 13 (similar to piston 7), to the next-succeeding station 14 where the pattern plate together with the pattern 15 will be cleaned by, for example, compressed air from suitable nozzles (similar to nozzles 32 in Figure 1) which may be turned on automatically during the movement of the plate towards this station. After the cleaning operation, the pattern plate is moved to the next-following station 16 to be sprayed with liquid or powder from nozzles 32 or to be subjected to other treatment in order to facilitate the release of any adhering sand from the pattern.

The next step in turn consists in moving the pattern plate to the upper table 4a of the inversion device 4 from which position the pattern plate will be transmitted to the lower position 4b in alignment with the piston or plunger 7. This movement is carried out by causing the inversion device to turn one half of a revolution upon the shaft 3 being rotated as described in the foregoing. Thus the pattern plate has now been returned to its initial position and can either be replaced by another pattern plate or alternatively be caused to pass through the several treatment stations once again.

The movement of the three pattern plates 6 in the upper and lower paths of the frame is thus carried out in one single operation by means of the operating plungers 7 and 13, respectively. The patterns 15 may be different or similar in shape. They may be fixed to the pattern plates or to the bottom of the flask.

The period of operation will be determined either by the time for moving the pattern plate from the device 4 onto the inversion device 5, following the squeezing, inversion, pattern drawing and removing of the flask mold, or alternatively by the time for transmission of the pattern plate from the inversion device 4 to the jolting device 9a, mounting of the flask mold, charging of the sand, jolting and transmission of the plate together with the flask mold to the station 10.

The inversion is carried out, for instance, by pneumatic cylinders 17, 18 placed in the frame and having inlets 33 for compressed air. Pistons 34 in said cylinders are connected to the shaft 3 through a chain 19 and chain pulley 20, for instance. However, the inversion devices could also be mounted on a stationary shaft, and in this case they will be acted on directly by the operating devices. The drive is timed to be synchronous in all operations, suitably from a driven cam shaft adapted to operate valves or control devices for the various mechanical, pneumatic or hydraulic appliances. It will be understood that the treatment stages or stations are not, of course, limited to six in number, the latter being variable from one case of application to another.

What I claim is:

1. In a molding machine comprising means for transmitting pattern plates successively from an initial position through a plurality of successive treatment stations, including a flask filling station and a pattern drawing station and back to the vicinity of said initial position, the improvement which comprises means for inverting the pattern plate and mold assembly preliminary to drawing the patterns so as to present said assembly at the drawing station with the pattern plate in inverted position, and a second means positioned to receive the pattern plate separated at said drawing station and effect a second inversion of said pattern plate preliminary to its association in a succeeding mold assembly for positioning at said flask filling station, said first and second inversion means being mounted in spaced relation on a common rotatable shaft.

2. A molding machine as claimed in claim 1 wherein said second inversion means is positioned intermediate the pattern drawing station and an initial mold and pattern assembly station in the series of successive treatment stations.

3. A molding machine as claimed in claim 1 including means for moving said pattern plates and any mold elements associated therewith from one station to the next in succession in synchronism with the operation of said inversion devices.

4. A molding machine as claimed in claim 3 wherein said moving means acts intermittently to advance said pattern plates from one station to the next one and with a pause in the movement at each treatment station.

5. A molding machine as claimed in claim 1, wherein a flask filling station is disposed alongside said shaft intermediate said two inversion means.

6. A molding machine as claimed in claim 5 wherein a flash jolting means is disposed alongside said shaft adjacent said flask filling station.

7. A molding machine as claimed in claim 1 wherein a pattern cleaning station and a liquid spraying station are positioned on the opposite side of said shaft intermediate said first and second inversion means.

References Cited in the file of this patent

UNITED STATES PATENTS

| | | |
|---|---|---|
| 1,492,225 | Scott | Apr. 29, 1924 |
| 1,673,889 | Silver | June 19, 1928 |
| 2,651,087 | Fellows | Sept. 8, 1953 |
| 2,669,758 | Valyi | Feb. 23, 1954 |
| 2,724,879 | Fischer | Nov. 29, 1955 |

OTHER REFERENCES

Foundry, November 1952, page 265.